United States Patent [19]

Lupatin et al.

[11] 4,233,658
[45] Nov. 11, 1980

[54] TRANSISTORIZED D-C/A-C CONVERTER

[75] Inventors: Elio Lupatin, Settimo Milanese; Luigi Rizzi, Milan, both of Italy

[73] Assignee: Societa Italiana Telecomunicazioni Siemens S.p.A., Milan, Italy

[21] Appl. No.: 863,412

[22] Filed: Feb. 16, 1978
(Under 37 CFR 1.47)

[30] Foreign Application Priority Data
Dec. 23, 1976 [IT] Italy .......................................... 30814

[51] Int. Cl.³ .......................................... H02P 13/18
[52] U.S. Cl. .......................................... 363/26; 363/97; 363/134
[58] Field of Search .......................................... 363/23-26, 363/97, 133-134

[56] References Cited

U.S. PATENT DOCUMENTS

| | | | |
|---|---|---|---|
| 3,657,631 | 4/1972 | Martens et al. | 363/26 |
| 3,859,583 | 1/1975 | Reed | 363/26 |
| 3,870,943 | 3/1975 | Weischedel et al. | 363/26 |
| 3,873,903 | 3/1975 | Koetsch et al. | 363/25 |
| 3,916,282 | 10/1975 | Rothermel | 363/25 |

*Primary Examiner*—J. D. Miller
*Assistant Examiner*—Peter S. Wong
*Attorney, Agent, or Firm*—Karl F. Ross

[57] ABSTRACT

A self-balancing d-c/a-c converter comprises a transformer whose primary winding is split into a pair of symmetrical halves each connected in series with a respective transistor and an associated resistor across a supply of direct current. A differential amplifier, with inputs connected across the two resistors through a pair of low-pass filters, generates an unbalance signal d in the form of a voltage of either polarity which is additively and subtractively superimposed upon a reference voltage e to provide two control signals e+d and e−d fed to respective inputs of two comparators. Two synchronized signal generators produce a sawtooth oscillation a and a square wave f, the latter having a period which is twice that of the former. Sawtooth wave a is fed in parallel to the other inputs of the two comparators while the square wave f and its complement g alternately unblock a pair of AND gates in cascade with these comparators. Two resulting pulse trains h and i, of a pulse width varying with the sign and magnitude of the unbalance signal d, energize the bases of the two transistors in a manner tending to rebalance the current traversing the transformer primary.

7 Claims, 7 Drawing Figures

TRANSISTORIZED d-c/a-c CONVERTER

FIELD OF THE INVENTION

Our present invention relates to a self-balancing d-c/a-c converter designed to energize a load with a symmetrical voltage such as a square wave.

BACKGROUND OF THE INVENTION

Converters of this description are frequently used for the direct or remote energization of components of telecommunication systems or the like. Such converters may also be inserted in a feedback circuit of a power supply as a means for controlling its output.

A conventional d-c/a-c converter of the transistorized type comprises a power transformer with a primary winding split into two halves each lying in series with a respective transistor whose emitters or collectors are interconnected at a junction point. A supply of direct current is connected between that junction point and a center tap of the primary to form a pair of substantially identical circuit branches for the alternate energization of the two primary halves upon conduction of the respective transistors. These transistors can be alternately saturated and cut off by an external source of driving pulses or by an oscillatory coupling including an ancillary transformer of the saturable-core type.

Even with careful selection of circuit components it is generally impossible to achieve a perfect symmetry of the two circuit branches and therefore an exactly balanced output voltage; a frequent cause of dissymmetry are differences in the storage times of the two transistors and possibly of their collector/emitter and base/emitter voltages on saturation.

A dissymmetry in the primary current gives rise to an undesired d-c component which may lead to a saturation of the power transformer during alternate half-cycles. Such saturation reduces the load impedance seen by one of the two switching transistors whereby that transistor is liable to break down, a risk aggravated by a rise in the operating temperature of the insufficiently loaded transistor with consequent shift of its conduction threshold and further intensification of the unbalance.

In order to minimize the danger of transistor breakdown, it is customary in such converters to insert limiting resistances in series with the primary of the power transformer and to dimension that transformer large enough to prevent its saturation under normal operating conditions. Even with these precautions, however, the aforementioned differences in storage times may cause objectionable distortions of the output voltage, particularly at elevated operating frequencies (e.g. on the order of 10 to 20 kHz) where a time difference of several microseconds may result in a d-c component amounting to 5-20% of the magnitude of the supply voltage.

It has already been proposed to sense the unbalance of the primary current by connecting a biasing winding of the aforementioned ancillary transformer across adjoining resistors in the two circuit branches to premagnetize the saturable core of this transformer in a manner tending to rebalance the transformer current by varying the ratio of the normally identical pulse widths of the trains of driving pulses fed to the respective transistor bases.

OBJECTS OF THE INVENTION

The general object of our present invention is to provide a self-balancing d-c/a-c converter not requiring any ancillary transformer.

A more particular object is to provide integrated circuitry for driving a transformer primary in a converter of this description.

SUMMARY OF THE INVENTION

A d-c/a-c converter according to our invention comprises sensing means connected across symmetrical portions of the two substantially identical circuit branches for producing an unbalance signal in response to an unsymmetrical current component traversing the split primary winding, this unbalance signal being fed together with a reference voltage to an arithmetic unit which produces therefrom two control signals varying in opposite senses upon deviation of the unbalance signal from zero. Two synchronized signal generators respectively produce a sawtooth voltage and a square wave whose period is twice that of the sawtooth voltage. A processor connected to the arithmetic unit and to the two signal generators synthesizes from their outputs a pair of pulse trains whose pulse width varies with the sign and the magnitude of the unbalance signal emitted by the sensing means, the bases of the two switching transistors being connected to the processor for receiving the two pulse trains therefrom and alternately saturating the transistors with a relative timing tending to minimize the unsymmetrical current component referred to above.

According to a more particular feature of our invention, the processor comprises comparison means and gating means in cascade, the comparison means having first inputs connected to respective outputs of the arithmetic unit and second inputs connected to the signal generator producing the sawtooth voltage, either directly or by way of the gating means. The other signal generator, producing the square wave, works into the gating means which could also be inserted downstream of the comparison means, i.e. between the output circuit thereof and the bases of the switching transistors.

The sensing means connected to the transformer primary advantageously comprises a differential amplifier with a pair of low-pass filters in its inputs. The arithmetic unit may comprise an adder and a subtractor superimposing the unbalance signal with relatively inverted sign upon the reference voltage.

BRIEF DESCRIPTION OF THE DRAWING

The above and other features of our invention will now be described in detail with reference to the accompanying drawing in which.

SPECIFIC DESCRIPTION

Figure 1:
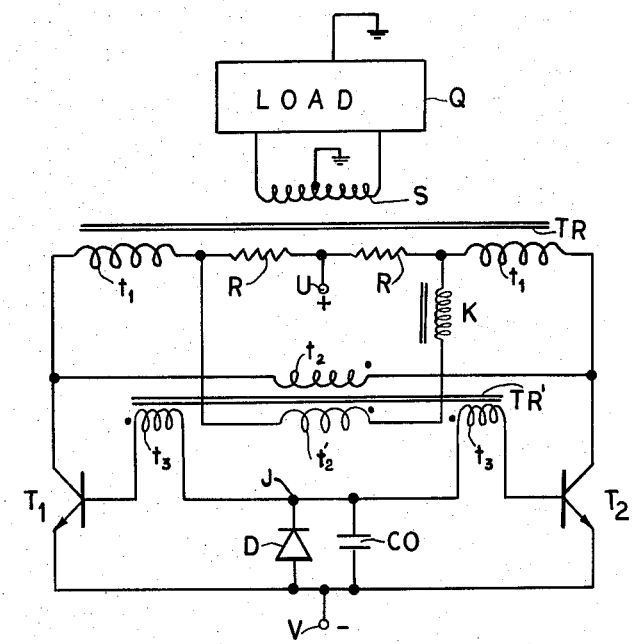
FIG. 1 is a circuit diagram of a conventional self-balancing d-c/a-c converter.

In FIG. 1 there is shown a prior-art d-c/a-c converter comprising a power transformer TR with a primary winding $t_1$ divided into two symmetrical halves and a secondary winding s with grounded midpoint working into a load Q. The two halves of primary winding $t_1$ are connected via a pair of series resistors R to the positive terminal U of a supply of direct current; the negative supply terminal V is connected to the emitters of a pair of NPN transistors $T_1$, $T_2$ whose collectors are tied to respective ends of the transformer primary. An ancillary transformer TR' has a primary $t_2$ connected across the two collectors, in parallel with primary $t_1$ and resistors R, transformer TR' having a saturable core and a pair of secondaries $t_3$ inserted between a junction point J and respective bases of transistors $T_1$, $T_2$. Junction point J is connected to negative terminal V by way of a reverse-poled diode D in parallel with a capacitor CO.

A biasing winding $T'_2$ on the saturable core of ancillary transformer TR' is connected across resistors R in series with a choke K designed to suppress alternating-current components from the primary circuit of transformer TR. The core of transformer TR' is thus premagnetized by an unbalance signal so as to vary the duration of the conduction intervals of transistors $T_1$ and $T_2$ with a view to minimizing the unbalance.

In FIG. 2 we have again shown the divided primary $t_1$ of power transformer TR in series with the collector/emitter paths of a pair of NPN transistors $T_1$ and $T_2$, a center tap of the primary being connected directly to the positive supply terminal U while the negative terminal V is connected to the two emitters via respective resistors R. Thus, each half of primary $t_1$ lies in a circuit branch including one of these resistors and one of the transistors for energization whenever the associated transistor conducts. As will be understood by persons skilled in the art, transistors $T_1$ and $T_2$ could also be reversed with minor circuit modifications to have their emitters connected to the primary and their collectors connected to resistors R.

An unbalance sensor connected across resistors R comprises a pair of low-pass filters $F_1$ and $F_2$ working into respective inputs of a differential amplifier A. This amplifier generates an unbalance signal d fed to an addend input of an adder $S_1$ and a subtrahend input of a subtractor $S_2$ together constituting an arithmetic unit. A reference voltage e, possibly the feedback signal of a controlled power supply in which the converter is inserted as noted above, is delivered to an augend input of adder $S_1$ and to a minuend input of subtractor $S_2$. A control signal $e+d$ appearing in the output of adder $S_1$ is fed to a subtractive input of a comparator $C_1$ while an analogous control signal $e-d$ is delivered from the output of subtractor $S_2$ to a corresponding input of another comparator $C_2$. Each of these comparators has an additive input receiving a sawtooth voltage a from a generator ST which is stepped by a timer TM. The same timer controls a square-wave generator SQ whose output voltage f has a period which is twice that of sawtooth voltage a as seen in FIGS. 3A and 3B.

Comparators $C_1$ and $C_2$, forming part of a binary processor M, feed respective pulse trains b and c to first inputs of a pair of AND gates $G_1$, $G_2$ whose second inputs are connected to the output of square-wave generator SQ, with interposition of an inverter $I_1$ in the case of gate $G_1$. Thus, gate $G_2$ receives the square wave f whereas gate $G_1$ receives its complement $g=\bar{f}$. Gates $G_1$ and $G_2$ pass modified pulse trains h and i to the bases of transistors $T_1$ and $T_2$, respectively.

Figure 2:
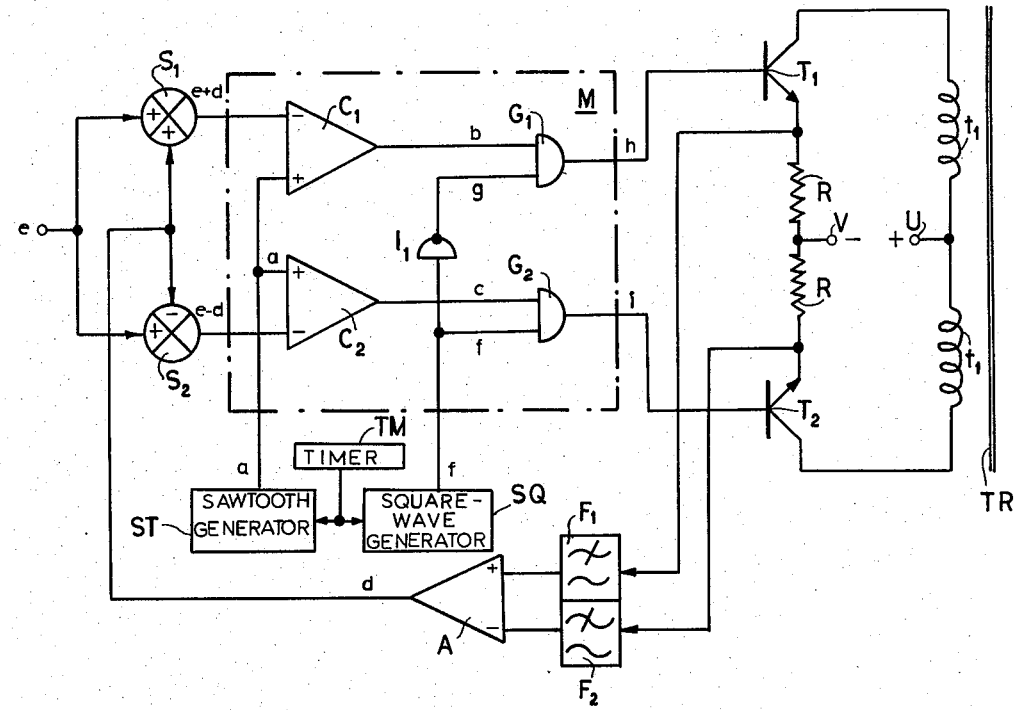
FIG. 2 is a circuit diagram of a self-balancing d-c/a-c converter embodying our invention.
Figure 3A:
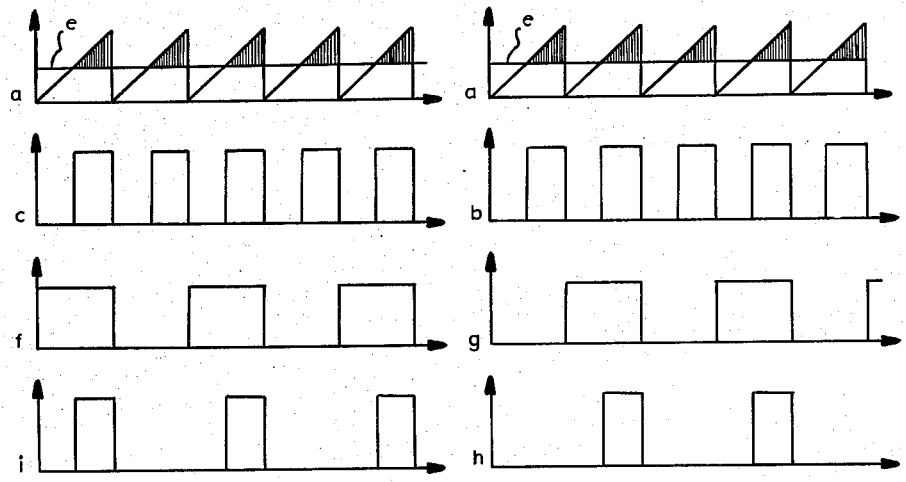
FIGS. 3A and 3B are two sets of graphs illustrating the mode of operation of the converter shown in FIG. 2.

FIG. 3A shows the mode of operation of the system of FIG. 2 when the primary current of transformer TR is in balance, i.e. with $d=0$. The subtractive inputs of comparators $C_1$ and $C_2$ then both receive the reference voltage e so as to conduct during identical time intervals represented by shading in the top graph a of FIG. 3A. The comparators, unlike the analog-type differential amplifier A, have a binary output so that signals b and c are identical pulse trains as shown in the second graph of FIG. 3A. Square wave f and its complement g (third graph of FIG. 3A) alternately block and unblock the coincidence gates $G_1$ and $G_2$ so as to pass only every other pulse of each train (bottom graph of FIG. 3A) to generate the driving pulses h and i for transistors $T_1$ and $T_2$. These transistors, therefore, are alternately saturated for identical lengths of time.

Figure 3B:
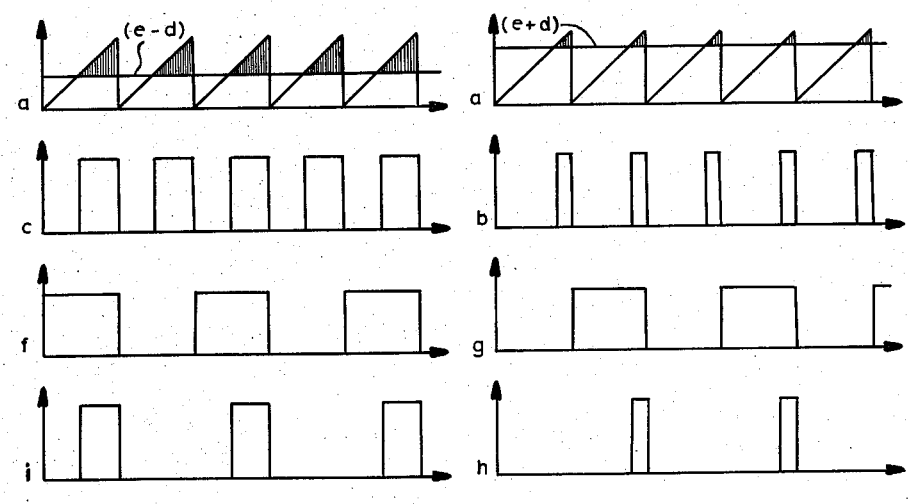

In FIG. 3B we have illustrated the situation where the unbalance signal d, which could be of either sign, has a finite value (here positive). Comparator $C_1$ now conducts for shorter periods than comparator $C_2$, as shown in the top graph of FIG. 3B, whereby pulses b are narrower than pulses c as seen in the second graph of that Figure. Square waves f and g, third graph, again alternately switch the gates $G_1$ and $G_2$ to suppress every other pulse in each train, thus producing the unequal driving pulses h and i of the bottom graph of FIG. 3B resulting in longer conduction periods for transistor $T_2$ compared with transistor $T_1$. This counteracts the current unbalance giving rise to the signal d in the output of amplifier A. Filters $F_1$ and $F_2$ substantially suppress all a-c components of the voltage difference appearing across resistors R.

Figure 4:
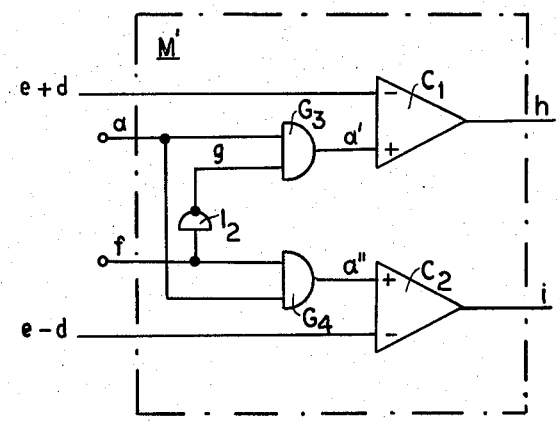
FIG. 4 is a circuit diagram showing a partial modification of the converter of FIG. 2.
Figure 5A:
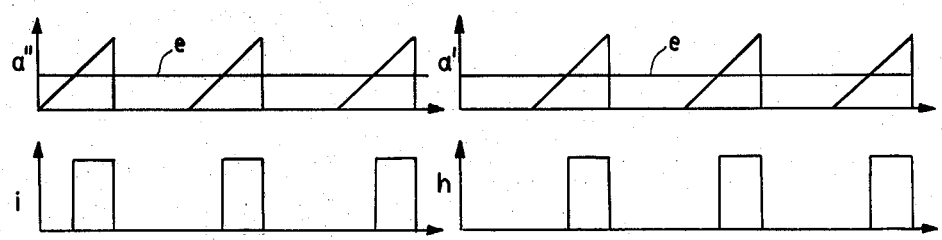
FIGS. 5A and 5B are two sets of graphs relating to the operation of the modified converter of FIG. 4.
Figure 5B:
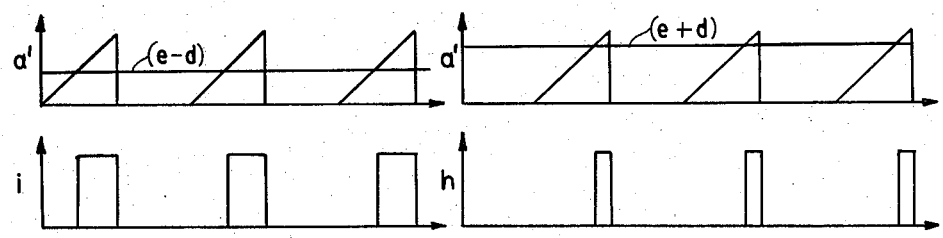

In FIG. 4 we have shown a modified processor M' for the otherwise unaltered converter of FIG. 2 in which AND gates $G_3$ and $G_4$ are interposed between the sawtooth-wave generator ST and the additive inputs of comparators $C_1$, $C_2$ working here directly into the bases of transistors $T_1$, $T_2$. Sawtooth wave a is fed in parallel to respective inputs of gates $G_3$, $G_4$ having other inputs alternately energized by square waves f and g from generator SQ, an inverter $I_2$ being inserted between that generator and gate $G_3$. Thus, AND gates $G_3$ and $G_4$ alternately pass trains of triangular pulses a' and a'' as has been illustrated in the upper graphs of FIGS. 5A and 5B, the former showing the balanced state whereas the latter relates to a condition of unbalance with $d\neq 0$. The resulting driving pulses h and i, issuing from comparators $C_1$ and $C_2$, have been represented in the bottom graphs of FIGS. 5A and 5B.

It will be apparent that the logic gates of FIGS. 2 and 4 need not be AND gates but, with minor changes in circuitry, could also be NOR gates, for example. Moreover, such coincidence gates might be inserted upstream of the comparator inputs receiving the control signals $e+d$ and $e-d$ rather than those receiving the sawtooth wave a. It will also be understood that, with suitable polarity inversions, the transistors $T_1$ and $T_2$ could be of PNP instead of NPN type. In any event, the logic gates, transistors, comparators and series resistors R can be readily embodied in integrated circuitry.

The switching frequency of our improved converter, as established by timer TM, may be on the order of 10 to 20 kHz.

We claim:

1. A d-c/a-c converter comprising:

a transformer having a secondary winding connected across a load and a primary winding divided into two symmetrical halves;

a pair of transistors each having a base, a collector and an emitter, the collector/emitter path of each transistor being connected between a respective half of said primary winding and a common junction point;

a supply of direct current connected between said junction point and a center tap of said primary winding, thereby forming a pair of substantially identical circuit branches for the energization of said halves upon conduction of the respective transistors;

sensing means connected across symmetrical portions of said circuit branches for producing an unbalance signal in response to an unsymmetrical current component traversing said primary winding;

an adder and a substractor connected in parallel to said sensing means and to a source of reference voltage for producing two control signals varying in opposite senses upon deviations of said unbalance signal from zero;

a first signal generator producing a sawtooth voltage;

a second signal generator producing a square wave with a period twice that of said sawtooth voltage; and processing means delivering a pair of pulse trains, of a pulse width varying with the sign and the magnitude of said unbalance signal, to the bases of said transistors for alternately saturating said transistors with a relative timing tending to minimize said unsymmetrical current component, said processing means including a pair of comparators in cascade with a pair of logic gates, said comparators having first inputs connected to receive said control signals from said adder and said subtractor, respectively, and further having second inputs connected to receive said sawtooth wave from said first signal generator, said logic gates having input connections with inversion means for respectively receiving said square wave and a complement thereof from said second signal generator.

2. A converter as defined in claim 1 wherein said sensing means comprises a differential amplifier.

3. A converter as defined in claim 2 wherein said sensing means further comprises a pair of low-pass filters inserted between said circuit branches and respective inputs of said differential amplifier.

4. A converter as defined in claim 3 wherein said circuit branches include a pair of identical resistors inserted between said junction point and said transistors, said low-pass filters being connected across said resistors.

5. A converter as defined in claim 1 wherein said logic gates are inserted between said comparators and said bases.

6. A converter as defined in claim 1 wherein said logic gates are inserted between said first signal generator and said second inputs.

7. A converter as defined in claim 1 wherein said transistors and said processing means are embodied in integrated circuitry.

* * * * *